United States Patent [19]

Podgorski

[11] Patent Number: 5,313,488
[45] Date of Patent: May 17, 1994

[54] RING LASER DISCHARGE STARTING CONCEPT

[75] Inventor: Theodore J. Podgorski, St. Paul

[73] Assignee: Honeywell Inc., Minneapolis, Minn.

[21] Appl. No.: 13,449

[22] Filed: Feb. 4, 1993

[51] Int. Cl.$^5$ .................. H01S 3/083; H01S 3/097
[52] U.S. Cl. ...................... 372/94; 313/618; 313/631
[58] Field of Search ............ 372/94, 87, 86; 356/350; 313/618, 619, 631, 632

[56] References Cited

U.S. PATENT DOCUMENTS

| | | | |
|---|---|---|---|
| 4,329,057 | 5/1982 | Zampiello | 356/350 |
| 4,481,635 | 11/1984 | Broberg et al. | 372/94 |
| 4,667,162 | 5/1987 | Broberg et al. | 330/4.3 |
| 4,885,754 | 12/1989 | Egawa | 372/86 |
| 4,969,157 | 11/1990 | Malvern | 372/94 |

Primary Examiner—James W. Davie
Attorney, Agent, or Firm—Craig J. Lervick

[57] ABSTRACT

The anodes in a ring laser gyroscope are appropriately positioned for the easy starting of a gas discharge and maintaining the discharge at a lower electrical potential. Two operating anodes are placed symmetrical with and in close proximity to a cathode while a third trigger anode is placed in direct line of sight with the cathode. This configuration allows ease in starting without using a very large starting voltage.

16 Claims, 3 Drawing Sheets

RING LASER DISCHARGE STARTING CONCEPT

FIELD OF THE INVENTION

The present invention relates to gas discharge lasers and more particularly to a discharge laser utilized by a ring laser gyroscope. The present invention provides for a gas discharge having a lower operating voltage and a lower start voltage.

BACKGROUND OF THE INVENTION

Ring laser gyroscopes are commonly used as angular rate sensors. An integral part of the ring laser gyro is the laser beam source or generator. One form of a laser beam generator comprises a gas discharge device. The gas discharge device is used to create a light beam. This light beam is then transmitted around a closed-loop path. A plurality of cavities in combination with a plurality of mirrors define the closed path. The path is usually triangular or rectangular, but any closed-loop polygonal path could also be used.

Present day gas discharge devices use a He-Ne gas which is excited by an electric current passing therethrough, consequently ionizing the gas and creating a plasma. As is well understood by those skilled in the art, the ionized gas produces a population inversion which results in the emission of photons, and in the case of He-Ne generation of a visible light. The He-Ne gas is contained within the aforementioned closed-loop path. By exciting the gas within the closed-loop path, the emitted visible light is forced to propagate around the closed-loop path. Two counterpropagating light signals are created, each traveling around the close-loop path in opposite directions.

It should be noted that prior art ring laser gyro systems are usually provided with a pair of electrical currents which flow in opposite directions. Each of the electrical currents create plasma in the gas. The current is established by applying electrical potential, of sufficient magnitude, between one cathode and one anode. As a consequence of the electrical current passing through the gas the gas molecule flow is affected. Since the electrical currents usually flow in at least a portion of the path traversed by the laser beams, the gas molecule flow caused by the electrical current results in a bias or error term in the gyro output. Accordingly, in the field of ring laser gyros, a pair of electrical currents are usually generated in order to balance the gas molecule flow effects caused by the individual currents. In ring laser systems of the prior art, a pair of electrical currents can be provided by a single cathode and a pair of anodes symmetrically placed relative to the closed-loop path of the laser beams. This configuration results in the gas flow effects caused by one of the electrical currents to be balanced by gas flow effects caused by the other one of the electrical currents.

Ring laser gyro systems similar to that just described have two inherent characteristics which hinder the ability to make the device lase. First, the body forming the optical cavity is usually of a very high dielectric index material causing the existence of stray capacitance between the electrodes and other parts of the structure. This stray capacitance causes an electrical charge to build up on or in the cavity, creating an electric potential which must be overcome to initiate electrical current between the cathode and anode.

Further, in some systems, particularly triangular ring lasers, the electrodes are not in a straight line relationship with each other through the cavities Current traveling through the gas between the cathode and anode must follow through at least a pair of connected cavity line segments forming the closed-loop path. This configuration requires the discharge current to travel around a corner. As a result, the start up potential required to initiate the electrical currents between each cathode and anode pair is very large and much greater than that required to initiate a current through a straight tube laser.

This type of arrangement where the cathode and the anodes are not in straight line relationship is illustrated in FIG. 1. There is shown a gyro block 110 having a plurality of interconnecting tunnels 12, 14 and 16. Attached to block 110 are a plurality of mirrors 20 which reflect light beams through interconnecting tunnels 12, 14 and 16. The mirrors also enclose the tunnels 12, 14 and 16, forming a closed-loop cavity.

Attached to block 110, on a first side 112, is a cathode 130. Cathode 130 communicates with the closed-loop cavity via a communication port 132 Also attached to block 110 is a first anode 140 and a second anode 142 which are attached to a second side 114 and a third side 116, respectively. First anode 140 and second anode 142 communicate with the closed-loop cavity via communication ports 134 and 136, respectively.

To initiate the flow of a discharge current a very large potential must be applied between the cathode 130 and the first anode 140, as well as between the cathode 130 and the second anode 142. As can be seen, the discharge current is required to flow around a corner (see a first corner 150 and a second corner 152), thus a very large starting potential is required between cathode 130 and the anodes 140 and 142.

In the prior art, initiation of electrical currents between the cathode and anode to cause ionization of the gas and subsequently cause the generation of laser beams is unreliable, usually slow to start, and requires a very large start up electrical potential between each cathode and anode pair.

SUMMARY OF THE INVENTION

It is an object of the present invention to provide ring laser gyro with a gas discharge that will start lasing using a lower start voltage. Furthermore, it is an object of the present invention to provide a gas discharge that operates using a lower operating voltage.

The laser gyroscope of the present invention provides a gas discharge which exists in a closed-loop cavity within a laser gyro block. A unitary body having a series of cylindrical cavities therein and a plurality of mirrors attached to the unitary body is used to form the closed-loop cavity. As is typically done in ring laser gyroscopes, one cathode and two anodes are used to create electrical current flowing in two different directions within the cavity. The two anodes are placed within the cavity and positioned to be symmetrical with respect to the single cathode. Furthermore, the two operating anodes are positioned relatively close to the cathode. Due to the relatively close positioning of the two anodes with respect to the cathode, discharge current will effectively flow therebetween at a lower operating voltage, following the initial starting of the gas discharge.

To create an arrangement which initiates the discharge current using lower voltage, a third anode is placed within the cavity. This third anode is positioned such that it is in direct straight-line alignment with the cathode, and in close proximity to the cathode. The third anode, or trigger anode, is positioned "across" the closed-loop path from the cathode. To initiate the gas discharge, an electrical potential is applied between the trigger anode and the cathode. Simultaneously, an electrical potential is applied between the cathode and each of the operating anodes. Due to the "straight-line" alignment and close proximity of the cathode and trigger anode, a discharge current is quickly established and a plasma created. The two operating anodes are now in "straight-line" alignment with the newly created plasma and the light emitted by this plasma ionizes the gas between itself and the anodes, thus allowing discharge current to subsequently travel to the operating anodes. At this point, the potential between the trigger anode and the cathode can be removed, allowing current to travel only between the cathode and two operating anodes.

The cathode and all of the anodes are positioned such that they will not interfere with the counterpropagating optical signals, thus allowing effective operation of the gyroscope.

BRIEF DESCRIPTION OF THE DRAWINGS

Further objects and advantages of the present invention can be seen by reading the following detailed description in conjunction with the following drawings in which.

DETAILED DESCRIPTION OF THE INVENTION

Figure 1:
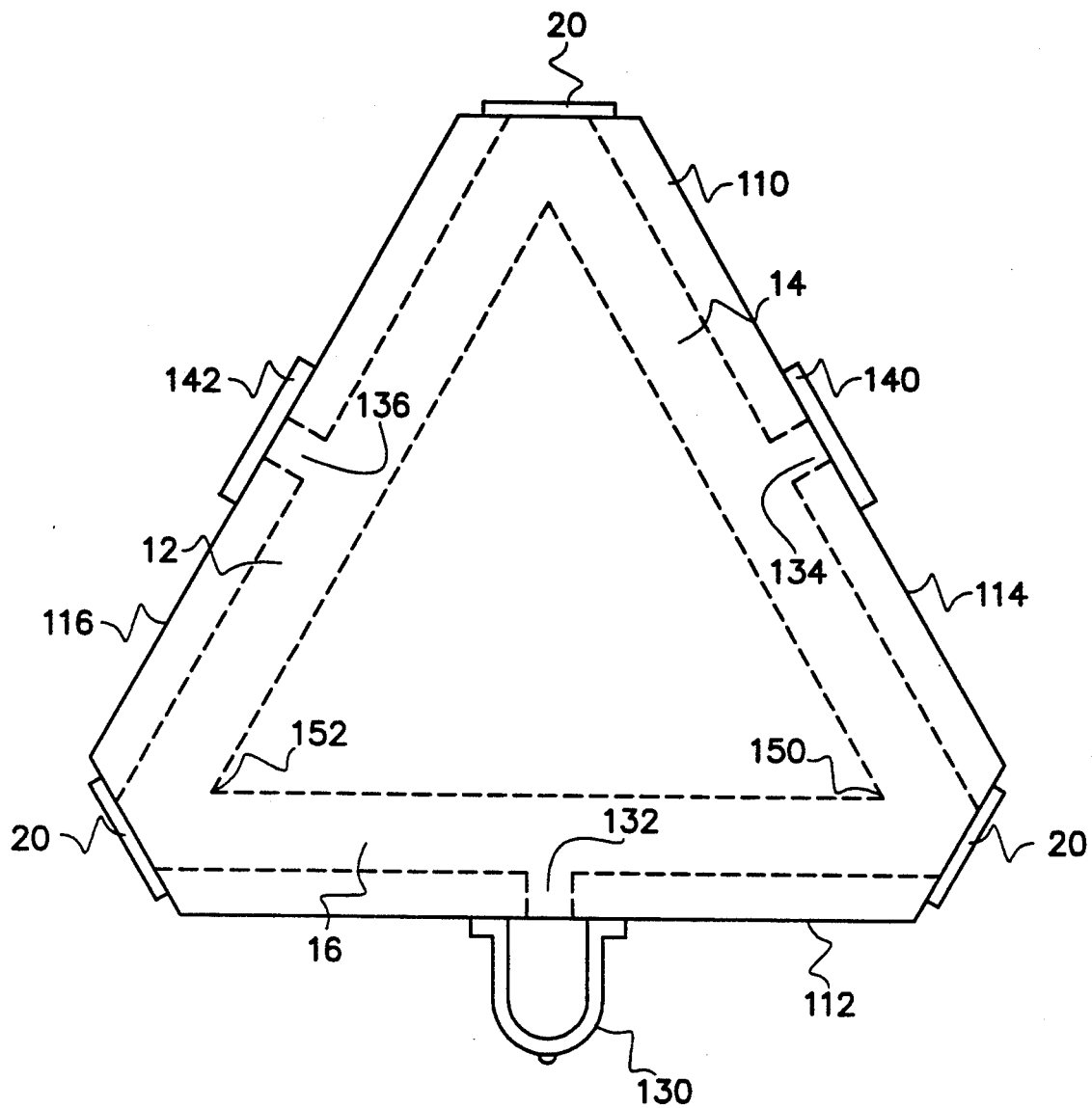
FIG. 1 illustrates the prior art electrode configuration used to create a discharge current.
Figure 2:
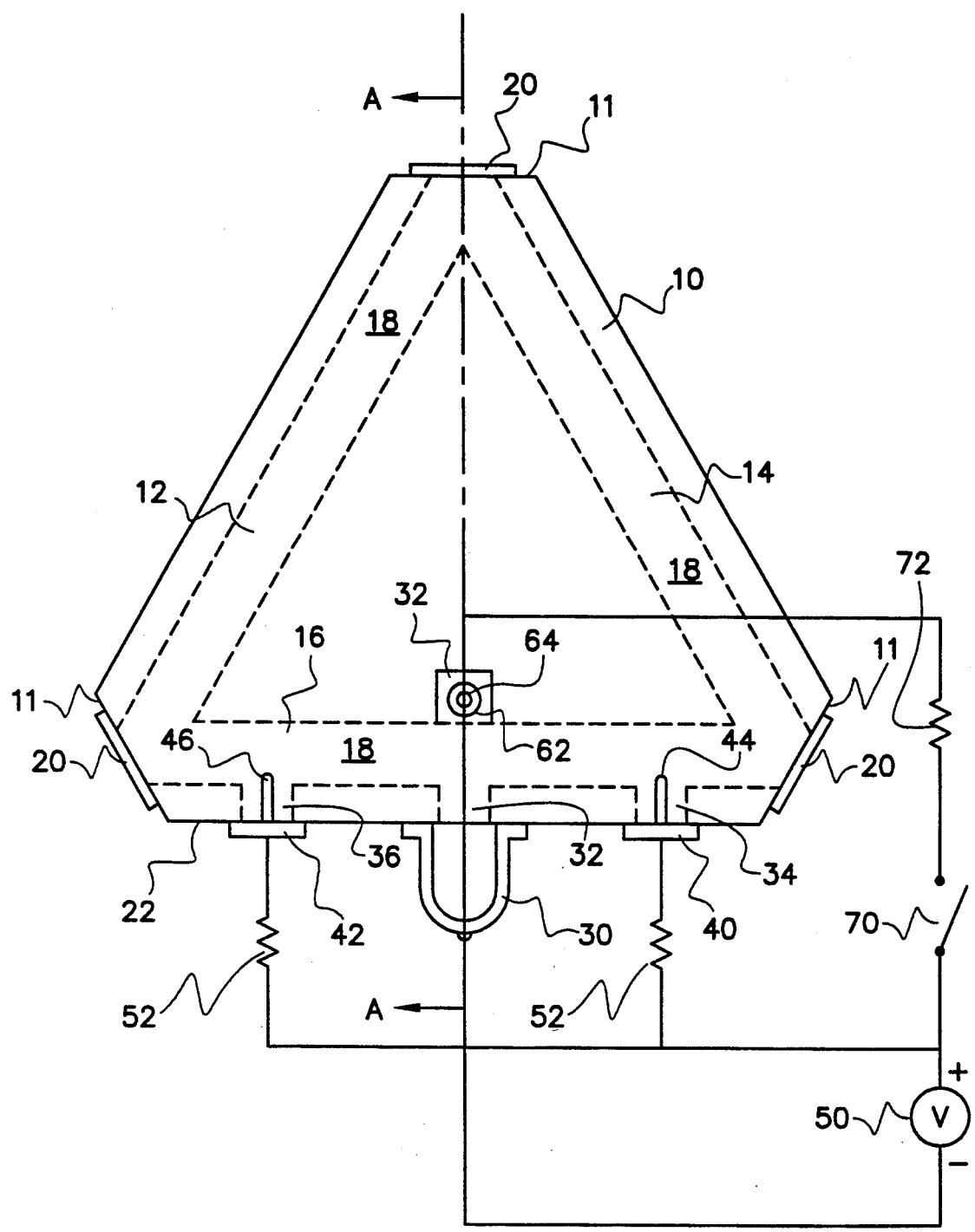
FIG. 2 is an illustration showing a ring laser gyro block having a cathode and two anodes attached to thereto using the principles of the present invention.

Referring now to FIG. 2, there is shown a gas filled ring laser gyroscope which utilizes the principles of the present invention to provide discharge starting at a lower voltage and discharge operation at a lower voltage. The ring laser gyroscope is comprised of a unitary body, or block 10. Unitary body 10 is typically made of an ultra-low expansion material to maintain thermal stability. In the preferred embodiment, block 10 is triangular in shape; however, any shape could be used. Within block 10 are a series of interconnecting cavities 12, 14 and 16 which are bored into block 10. These cavities 12, 14 and 16 are configured in a triangular manner, meeting each other at the corners of the triangle. The cavities 12, 14 and 16 are positioned so as to meet at an exterior surface 11 of block 10. In the preferred embodiment, a triangular configuration is used for the cavities 12, 14 and 16; however, any polygonal shape could also be used. The cavities 12, 14 and 16 define a closed-loop path 18 within block 10 in which optical signals will propagate. At each apex of the triangle where cavities 12, 14 and 16 meet there is attached a mirror 20. The mirrors 20 are attached to block 10 so as to form a gastight seal therebetween. Mirrors 20 allow the reflection of light waves around the closed-loop cavity thus forming a continuance path for the propagation of light beams.

In order to create a gas discharge and cause the gas to "lase", cathodes and anodes are required. A cathode 30 is attached to block 10 on one side 22 thereof. In addition to cavities 12, 14 and 16, the gyro block contains a plurality of communication ports 32, 34 and 36 for communication between the cavity and devices mounted to the exterior of block 10. Cathode 30 is attached to an exterior surface 22 of block 10 and is positioned directly over first communication port 32. This position and alignment allows for communication between cathode 30 and the gas within gas filled cavity 18. Cathode 30 is attached to block 10 so as to form a gastight seal between cathode 30 and block 10. This gastight seal is required because cavity 18 must be gastight and entirely self contained.

Also, attached to block 10 at surface 22 are a first pin anode 40 and a second pin anode 42. The pin anodes 40 and 42 are attached to gyro block on the same surface as cathode 30 and positioned symmetrically on either side of cathode 30. Furthermore, pin anodes 40 and 42 are attached to block 10 and positioned directly over second communication port 34 and third communication port 36, respectively. By positioning first pin anode 40 and second pin anode 42 in this manner allows for communication between pin anodes 40 and 42 and the gas inside gas filled chamber 18. As with cathode 30, pin anodes 40 and 42 are attached to block 10 such that they form a gastight seal between block 10 and themselves.

Pin anode 40 is configured to have a post member 44 which extends into second communication port 34. Post member 44 extends just far enough into gas filled cavity 18 so as to allow efficient communication with the gas inside cavity 18 while not interfering with the light beams counterpropagating within cavity 18. Post member 44 must have direct line of sight to the intersection region of communication port 32 and cavity 18; therefore, post member 44 extends slightly into cavity 18.

Similarly, second pin anode 42 has a post member 46 which extends into communication port 36. Again, post member 46 extends just far enough into gas filled cavity 18 to allow efficient communication with the gas therein while not interfering with the counterpropagating light beams. Post member 46 must also have direct line of sight to the intersection region of communication port 32 and cavity 16. Neither first pin anode 40 nor second pin anode 42 are positioned to be in straight line alignment with cathode 30. Therefore, for a discharge current to travel between either first pin anode 40 and cathode 30 or second pin anode 42 and cathode 30, this discharge current must follow a nonlinear path.

Electrically connected to cathode 30 is a voltage source 50 connected at its negative terminal, thus providing the negative side of an electrical potential to cathode 30. Connected to the positive terminal of supply 50 are first pin anode 40 and second pin anode 42. Connected between the voltage supply 50 and the pin anodes 40 and 42 are resistors 52 for limiting the flow of current. Voltage supply 50 provides a sufficient potential between pin anodes 40 and 42 and cathode 30 to support a discharge current once the discharge has been initiated. The potential supplied by voltage supply 50 to cathode 30 and pin anodes 40 and 42, however, is not sufficient to start the gas discharge within gas filled chamber 18.

Figure 3:
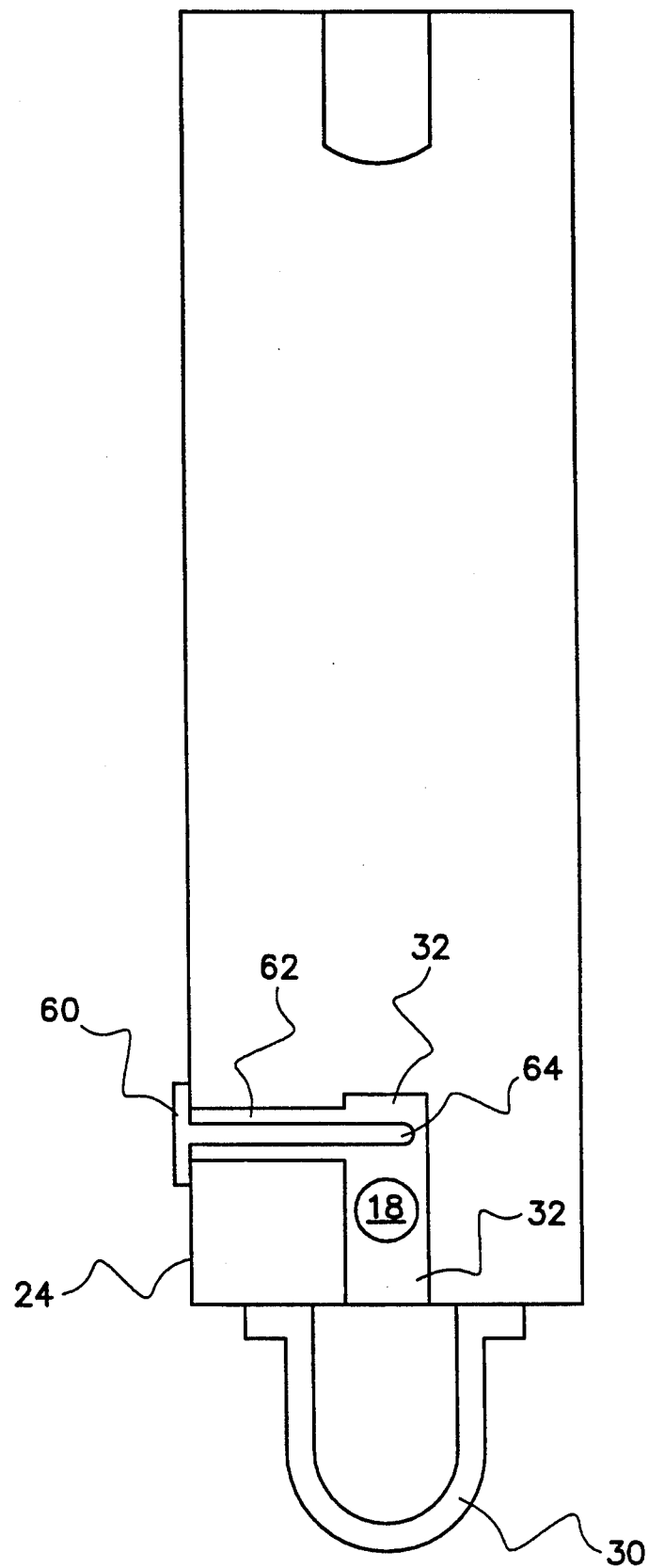
FIG. 3 is a side view of a ring laser gyro block of the present invention showing the relative positioning of the cathode and pin trigger anode.

As previously mentioned, the prior art typically used a high voltage signal between the anode and the cathode to start the flow of a discharge current, thus ionizing the gas within the chamber. However in the present invention the high voltage source is not necessary. Referring now to FIG. 3, with continual reference to FIG. 2, there is shown a cross sectional view along cross section A—A. As can be seen more clearly in FIG. 3, a trigger pin anode 60 is attached to the block on a second side 24 thereof. Trigger pin anode 60 is attached to the block and positioned to cover a fourth communication port 62. Similar to that of first pin anode 40 and second pin anode 42, trigger pin anode 60 has a post section 64 which extends into fourth communication port 62. Post member 64 is aligned to be above gas filled cavity 18 but extending into an extension of first communication port 32. As can be seen, post member 64 of trigger pin anode 60 is directly aligned with cathode 30. Due to the positioning of trigger pin anode 60, post member 64 can "see" cathode 30. Since post member 64 is positioned above gas filled chamber 18, post 64 will not interfere with counterpropagating light beams within gas filled chamber 18.

Referring again to FIG. 2, pin trigger anode 60 is electrically connected to a switch 70 via a second resistor 72. This electrical connection allows for pin trigger anode 60 to be held at an electrical potential with respect to the cathode 30.

In the prior art it has been difficult to start a gas discharge without using a high voltage signal. To start the discharge in the present invention cathode 30 is held at a first electrical potential while first anode 40, second anode 42, and pin trigger anode 60 are all held at a second electrical potential. The electrical potential used again is not sufficient to start a discharge current to flow between cathode 30 and either first pin anode 40 or second pin anode 42. However, since pin trigger anode is directly aligned with cathode 30 and is in closed proximity to cathode 30, the electrical potential applied between cathode 3 and pin trigger anode 60 is sufficient to start a discharge current to move between these two elements. This discharge current causes an ionization of the gas within gas filled cavity 18, thus creating a plasma between pin trigger anode 60 and cathode 30.

As previously mentioned, first pin anode 40 and second pin anode 42 extend through second communication port 34 and third communication port 36, respectively. The post member 44 of pin anode 40 extends through second communication port 34 and just into gas filled cavity 18. Since the end of post portion 44 extends slightly into gas filled cavity 18, it is in direct line of sight with the plasma created between cathode 30 and pin trigger anode 60. Similarly, post member 46 of second pin anode 42 extends slightly into gas filled cavity 18. This allows post member 46 to also be in direct line of sight with the plasma created between cathode 30 and pin trigger anode 64. Due to the direct line of sight between pin anode 40 and the plasma which now exists between cathode 30 and trigger pin 60, a discharge current is now easily established between pin anode 40 and cathode 30 using the previously mentioned lower electrical potential. Similarly, a discharge current is established between second pin anode 42 and cathode 30 using the previously mentioned lower electrical potential. At this point the discharge current travels between cathode 30 and first pin anode 40, thus causing the ionization of gas and the emission of photons. Similarly, a discharge current exist between cathode 30 and second pin anode 42, thus creating a ionization of gas and an emission of photons. At this point the gas discharge has started and switch 70 may be switched "off" or opened. The establishment of discharge currents, as just described, operates very quickly, thus it is not necessary to energize pin trigger anode for a long period of time.

First pin anode 40 and second pin anode 42 are attached to laser block 10 on surface 22, the same surface to which cathode 30 is attached. Furthermore, the pin anodes 40 and 42 are fairly close to cathode 30. The small distance between pin anode 40 and cathode 30 allows a discharge current to exist there between while maintaining relatively low electrical potential. Similarly, a discharge current will exist between pin anode 42 and cathode 30 while maintaining a relatively low electrical potential. Therefore, the discharge currents within gas filled chamber 18 will operate at a much lower voltage level, thus causing ionization of the gas therein and the emission of light beams.

It will be understood by those skilled in the art that other schemes of switching could be used to accomplish the starting of the gas discharge. For example, a second source of electrical potential could be momentarily connected to pin trigger anode 60 to cause the starting of the discharge and then removed.

Having described the invention in considerable detail it will be understood that the present invention can be modified in arrangement and detail without departing from the principles of the invention. We claim all modifications coming within the spirit and scope of the following claims.

What is claimed is:

1. A gas discharge device, comprising:
  a block containing a gas filled cavity, the block having a plurality of communication ports extending from an exterior surface of the block for communication between the cavity and the surface of the block;
  a cathode attached to a first exterior surface of the block and positioned above a first communication port so as to allow communication between the cathode and the gas within the gas filled chamber;
  a pin anode having a post member, the pin anode attached to the first exterior surface of the block and positioned such that the post member of the pin anode extends into the gas filled cavity through a second communication port but is not in direct line with the cathode; and
  a trigger pin anode having a post member, the trigger pin anode attached to a second exterior surface of the block such that the post member of the trigger pin anode extends into the gas filled cavity, the trigger pin anode being positioned in close proximity to and in direct line with the cathode.

2. The gas discharge of claim 1 further comprising a second pin anode having a post member, the second pin anode attached to the first exterior surface of the block and positioned such that the post member of the pin anode extends into the gas filled cavity through a third communication port but is not directly aligned with the cathode.

3. The gas discharge of claim 1 wherein the cathode is held at a first electrical potential and the pin anode is held at a second electrical potential.

4. The gas discharge of claim 3 wherein the trigger pin anode is held at a third electrical potential for a brief period of time until a gas discharge is established within the gas filled cavity.

5. The gas discharge of claim 1 wherein the pin anode covers the second communication port and forms a gastight seal with the block.

6. The gas discharge of claim 1 wherein the cathode covers the first communication port and forms a gastight seal with the block.

7. The gas discharge of claim 2 wherein the cathode is held a first electrical potential while the pin anode and the second pin anode are held at a second electrical potential.

8. The gas discharge of claim 7 wherein the trigger pin anode is held at a third electrical potential for a brief period of time until a gas discharge is established within the gas filled cavity 9. The gas discharge of claim 2 wherein the second pin anode covers the third communication port and forms a gastight seal with the block.

10. A ring laser gyroscope, comprising:
a block containing a closed loop, gas filled cavity for supporting two counterpropagating optical signals, the block having a plurality of communication ports extending inwardly from an exterior surface of the block and intersecting the gas filled cavity;
a cathode attached to an outer surface of the block and covering a first communication port;
a first pin anode attached to an outer surface of the block, the first anode having a post which extends from the outer surface of the block into a second communication port, the first anode being positioned away from the cathode such that a direct path within the gas filled cavity between the first anode and the cathode does not exist;
a second pin anode attached to an outer surface of the block the second anode having a post which extends from the outer surface of the block into a third communication port, the second anode being positioned away from the cathode such that a direct path within the gas filled cavity between the second anode and the cathode does not exist; and
a trigger pin anode attached to an outer surface of the block, the trigger pin anode having a post extending into a fourth communication port, the trigger pin anode positioned in close proximity to the cathode and such that a direct path exists between the trigger pin anode and the cathode.

11. The ring laser gyro of claim 10 wherein the cathode is held at a first electrical potential while the first pin anode and second pin anode are held at a second electrical potential, the first electrical potential being lower than the second electrical potential.

12. The ring laser gyro of claim 11 wherein the trigger pin anode is held at a third electrical potential for a short period of time until a gas discharge is developed.

13. The ring laser gyro of claim 10 wherein the cathode, first pin anode and second pin anode are attached to a single outer surface of the block.

14. The ring laser gyro of claim 13 wherein the trigger pin anode is attached to a second surface of the block, the second outer surface is perpendicular to the outer surface of the block which the cathode, first pin anode and second pin anode are attached.

15. The ring laser gyro of claim 10 wherein the closed-loop path is triangular.

16. A ring laser gyroscope using two counterpropagating light beams for sensing rotation in inertial space, comprising:
a gyro block having a closed-loop cavity therein, the cavity consisting of three interconnected tunnels configured in a triangular shape which intersect at each apex of the triangle, the block further having a first communication port extending from a first exterior surface of the gyro block to the closed-loop cavity, a second communication port extending from the first exterior surface to the closed-loop cavity, a third communication port extending from the first exterior surface to the closed-loop cavity and a fourth communication port extending from a second exterior surface of the block to the closed-loop cavity, the first communication port, the second communication port, and the third communication port all being collinear and in close proximity to one another on the first exterior surface, the cavity being filled with an active gas;
three mirrors attached to the gyro block and positioned at each apex of the triangular cavity to cause an optical signal to propagate around the closed-loop cavity;
a cathode attached to the first exterior surface of the gyro block and positioned to cover the first communication port and form a gastight seal therewith;
a first pin anode attached to the first exterior surface of the gyro block and positioned to cover the second communication port, the first pin anode having a post member extending into the second communication port;
a second pin anode attached to the first exterior surface of the gyro block and positioned to cover the third communication port, the second pin anode having a post member extending into the third communication port;
a trigger pin anode attached to the second exterior surface of the gyro block and positioned to cover the fourth communication port, the trigger pin anode having a post member extending into the fourth communication port;
a source of electrical potential having a first contact and a second contact, the first contact being connected to the cathode while the second contact being connected to the first pin anode and the second pin anode; and
a switch connected between the source of electrical potential second contact and the trigger pin anode, wherein the second contact will be electrically connected to the trigger anode when the switch is closed, the switch for monetarily energizing the trigger anode to start a gas discharge within the cavity.

* * * * *